United States Patent
Yang et al.

(10) Patent No.: US 8,953,580 B2
(45) Date of Patent: Feb. 10, 2015

(54) TRANSPORT STREAM PACKETS WITH TIME STAMP GENERATION BY MEDIUM ACCESS CONTROL

(75) Inventors: Chil-youl Yang, Gwanak-gu (KR); Scott Seong-wook Lee, Yongin-si (KR); Dong-hwi Roh, Seocho-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 891 days.

(21) Appl. No.: 11/730,270

(22) Filed: Mar. 30, 2007

(65) Prior Publication Data

US 2008/0075052 A1 Mar. 27, 2008

(30) Foreign Application Priority Data

Sep. 22, 2006 (KR) .................. 10-2006-0092457

(51) Int. Cl.
*H04J 3/06* (2006.01)
*H04N 21/43* (2011.01)
*H04L 1/18* (2006.01)
*H04N 21/2343* (2011.01)
*H04W 28/04* (2009.01)
*H04W 74/00* (2009.01)

(52) U.S. Cl.
CPC ............ *H04N 21/4307* (2013.01); *H04L 1/189* (2013.01); *H04N 21/234318* (2013.01); *H04W 28/04* (2013.01); *H04W 74/00* (2013.01)
USPC ........... 370/350; 370/503; 370/473; 370/236; 370/345; 455/450; 455/509; 709/223

(58) Field of Classification Search
CPC ............... H04L 1/0007; H04L 1/0025; H04N 21/234318; H04N 21/4307
USPC .................. 370/350, 503–520; 455/502, 503
See application file for complete search history.

(56) References Cited

U.S. PATENT DOCUMENTS

| 5,537,408 | A | 7/1996 | Branstad et al. |
| 6,470,031 | B1 | 10/2002 | Loy et al. |
| 7,058,071 | B1 | 6/2006 | Myles et al. |
| 7,080,160 | B2 | 7/2006 | Cognet et al. |

(Continued)

FOREIGN PATENT DOCUMENTS

CN 1784857 A 6/2006

OTHER PUBLICATIONS

Office Action form the State Intellectual Property Office of P.R. China, dated May 20, 2011, issued in Application 200780035226.36.

(Continued)

*Primary Examiner* — Gerald Johnson
(74) *Attorney, Agent, or Firm* — Sughrue Mion, PLLC

(57) ABSTRACT

Provided is a method of processing and transmitting transport stream packets and processing the transmitted transport stream packets. A time stamp is generated in a medium access control (MAC) layer based on time information managed by the MAC layer, and a data frame including the transport stream packets is retransmitted based on an algorithm different from that used for a general data frame when a transmission error occurs. Therefore, there is no need to transmit and receive additional synchronization packets in order to precisely transmit the transport stream packets between transmitting and receiving terminals, and it is possible to reduce performance deterioration caused by latency and jitter.

24 Claims, 4 Drawing Sheets

(56) References Cited

U.S. PATENT DOCUMENTS

| | | | |
|---|---|---|---|
| 7,349,433 B2* | 3/2008 | Ho | 370/469 |
| 7,508,809 B2* | 3/2009 | Nagai et al. | 370/345 |
| 2002/0024970 A1 | 2/2002 | Amaral et al. | |
| 2002/0150126 A1 | 10/2002 | Kovacevic | |
| 2003/0043744 A1* | 3/2003 | Lu et al. | 370/236 |
| 2003/0079230 A1 | 4/2003 | Woodward, Jr. et al. | |
| 2003/0169769 A1* | 9/2003 | Ho et al. | 370/473 |
| 2003/0214982 A1 | 11/2003 | Lorek et al. | |
| 2004/0008661 A1* | 1/2004 | Myles et al. | 370/350 |
| 2004/0053621 A1* | 3/2004 | Sugaya | 455/450 |
| 2004/0076186 A1* | 4/2004 | Chen et al. | 370/503 |
| 2004/0160930 A1* | 8/2004 | Choi et al. | 370/338 |
| 2004/0218527 A1 | 11/2004 | Schwartz | |
| 2005/0036512 A1 | 2/2005 | Loukianov | |
| 2005/0114489 A1* | 5/2005 | Yonge et al. | 709/223 |
| 2005/0175040 A1 | 8/2005 | Holborow | |
| 2005/0226207 A1* | 10/2005 | Sharma | 370/350 |
| 2006/0189352 A1 | 8/2006 | Nagai et al. | |
| 2006/0209769 A1* | 9/2006 | Akamatsu et al. | 370/338 |

OTHER PUBLICATIONS

Communication dated Jan. 30, 2013 from the Korean Intellectual Property Office in a counterpart application No. 10-2006-0092457.

IEEE Computer Society: "IEEE Std 802.15.4-2006 (Revision of IEEE Std 802.15.4-2003); Part 15.4: Wireless Medium Access Control (MAC) and Physical Layer (PHY) Specifications for Low-Rate WirelessPersonal Area Networks (WPANs); pp. 1-24 and 166-169", Internet Citation, Sep. 8, 2006, pp. I-II, XP002656040, Retrieved from the Internet: URL:http://standards.ieee.org/getieee802/download/802.15.4-2006.pdf.

IEEE Computer Society: "IEEE Std 802.15.3-2003, Part 15.3: Wireless Medium Access Control (MAC) and Physical Layer (PHY) Specifications for High Rate Wireless Personal Area Networks (WPANs), pp. 1-315", Sep. 29, 2003.

IEEE Computer Society: "IEEE Std 802.11. 1999, Part 11: Wireless LAN Medium Access Control (MAC) and Physical Layer (PHY) Specifications, pp. 1-512", 1999.

Communication from the European Patent Office issued Mar. 5, 2012 in counterpart European Application No. 07793752.2.

Communication from the European Patent Office issued Mar. 15, 2012 in counterpart European Application No. 07793752.2.

Communication dated Apr. 20, 2012 from the State Intellectual Property Office of P.R. China in a counterpart application No. 200780035226.3.

Communication dated Mar. 19, 2014 from the State Intellectual Property Office of P.R. China in counterpart application No. 200780035226.3.

Communication, Issued by the State Intellectual Property Office of P.R. China, Dated Oct. 17, 2014, in counterpart Chinese application No. 200780035226.3.

* cited by examiner

US 8,953,580 B2

TRANSPORT STREAM PACKETS WITH TIME STAMP GENERATION BY MEDIUM ACCESS CONTROL

CROSS-REFERENCE TO RELATED PATENT APPLICATION

This application claims the benefit of Korean Patent Application No. 10-2006-0092457, filed on Sep. 22, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to a transport stream, and more particularly, to processing and transmitting transport stream packets, and processing the transmitted transport stream packets.

2. Description of the Related Art

In order to transmit audio-visual (AV) data, a transport stream (TS) format is generally used. When the AV data is received or transmitted, time synchronization between the transmitting and receiving terminals is very important. Therefore, the transmitting terminal and the receiving terminal transmit and receive packets including time information, and the terminals attempt synchronization by using various algorithms.

FIG. 1 is a conceptual view for explaining a method of transmitting transport stream packets according to the related art.

The apparatus on the left contains a TS generator, which is a source for providing transport stream packets and may be a storage medium for storing image data, a streaming application, or a Moving Picture Experts Group (MPEG) encoder. The apparatus on the right contains a TS consumer, which consumes the transport stream packets and may be a display device, a multiplexer/demultiplexer (MUX/DEMUX), or a MPEG decoder.

The transmitting terminal transmits the transport stream packets to the receiving terminal through a network interface according to the network type such as Ethernet or wireless LAN. The TS generator of the transmitting terminal and the TS consumer of the receiving terminal control the transmission using information included in the transport stream packets, but the network interface does not participate in this process. More specifically, a medium access control (MAC) layer or a physical layer does not determine whether or not data transmitted from an upper layer is a transport stream packet, and thus processes all data by the same method, and does not perform control manipulation for the transport stream packet.

Therefore, according to the related art, in the process of transmitting the transport stream packets through a network, latency and jitter may occur, preventing the receiving terminal from outputting images precisely. In addition, to prevent the latency and jitter, the TS generator of the transmitting terminal and the TS consumer of the receiving terminal have to include additional modules in an application layer to perform precise synchronization on the transport stream packets. The transmitting and receiving terminals also have to exchange packets for synchronization. Accordingly, implementation is excessively complex.

SUMMARY OF THE INVENTION

An exemplary embodiment of the present invention provides a method and apparatus for processing and transmitting transport stream packets in a medium access control (MAC) layer of a network terminal.

According to an aspect of the present invention, there is provided a method of transmitting transport stream packets from a terminal connected to a network, the method including: generating a time stamp with reference to time information managed in synchronization with other terminals by the MAC layer in order to control medium use in the network; processing the transport stream packets by using the time stamp; and transmitting the processed transport stream packets.

The network may be a wireless local area network (WLAN). In this case, the time information is a value which is set with reference to a time stamp field of a beacon frame.

The network may be a wireless personal area network (WPAN). In this case, the time information is a value which is set with reference to a piconet synchronization parameters field of a beacon frame.

The processing may include: generating a packet group by grouping a plurality of the transport stream packets; and generating a MAC protocol data unit (MPDU) by adding the time stamp to the packet group.

The processing may further include recording information indicating that the transport stream packets are included in the MPDU.

In the transmitting, when a transmission error occurs, retransmission may be performed based on a predetermined set value not on a retry limit set by the network.

In the transmitting, when a transmission error occurs, retransmission may be performed until all the transport stream packets which are transmitted in advance and stored in a buffer of the other terminal which receives the transport stream packets are consumed.

According to another aspect of the present invention, there is provided a computer-readable medium having embodied thereon a computer program for executing the method of transmitting the transport stream packets.

According to another aspect of the present invention, there is provided an apparatus for transmitting transport stream packets from a terminal connected to a network, the apparatus including: a time stamp generator generating a time stamp with reference to time information managed in synchronization with other terminals by the MAC layer in order to control medium use in the network; a packet processor processing the transport stream packets by using the time stamp; and a transmitter transmitting the processed transport stream packets.

According to another aspect of the present invention, there is provided a method of processing transport stream packets in a MAC layer of a terminal connected to a network, the method including: extracting a time stamp from a frame received through a network; and outputting the transport stream packets included in the frame with reference to the extracted time stamp and time information managed in synchronization with other terminals by a MAC (medium access control) layer in order to control medium use in the network.

In the outputting, a plurality of the transport stream packets may be output by using a single time stamp according to a predetermined rule.

According to another aspect of the present invention, there is provided a computer-readable medium having embodied thereon a computer program for executing the method of processing the transport stream packets.

According to another aspect of the present invention, there is provided an apparatus for processing transport stream packets in a MAC layer of a terminal connected to a network, the apparatus including: a time stamp extracting unit extracting a time stamp from a frame received through the network; and an outputting unit outputting the transport stream packets included in the frame with reference to the extracted time stamp and time information managed in synchronization with other terminals by a MAC (medium access control) layer in order to control medium use in the network.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Exemplary embodiments of the present invention will now be described in detail with reference to the attached drawings.

Figure 1:
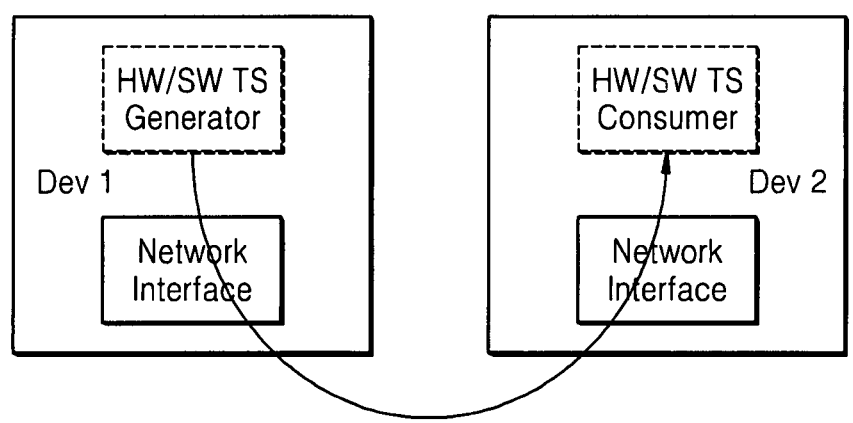
FIG. 1 is a conceptual view for explaining a method of transmitting transport stream packets according to a related art.
Figure 2:
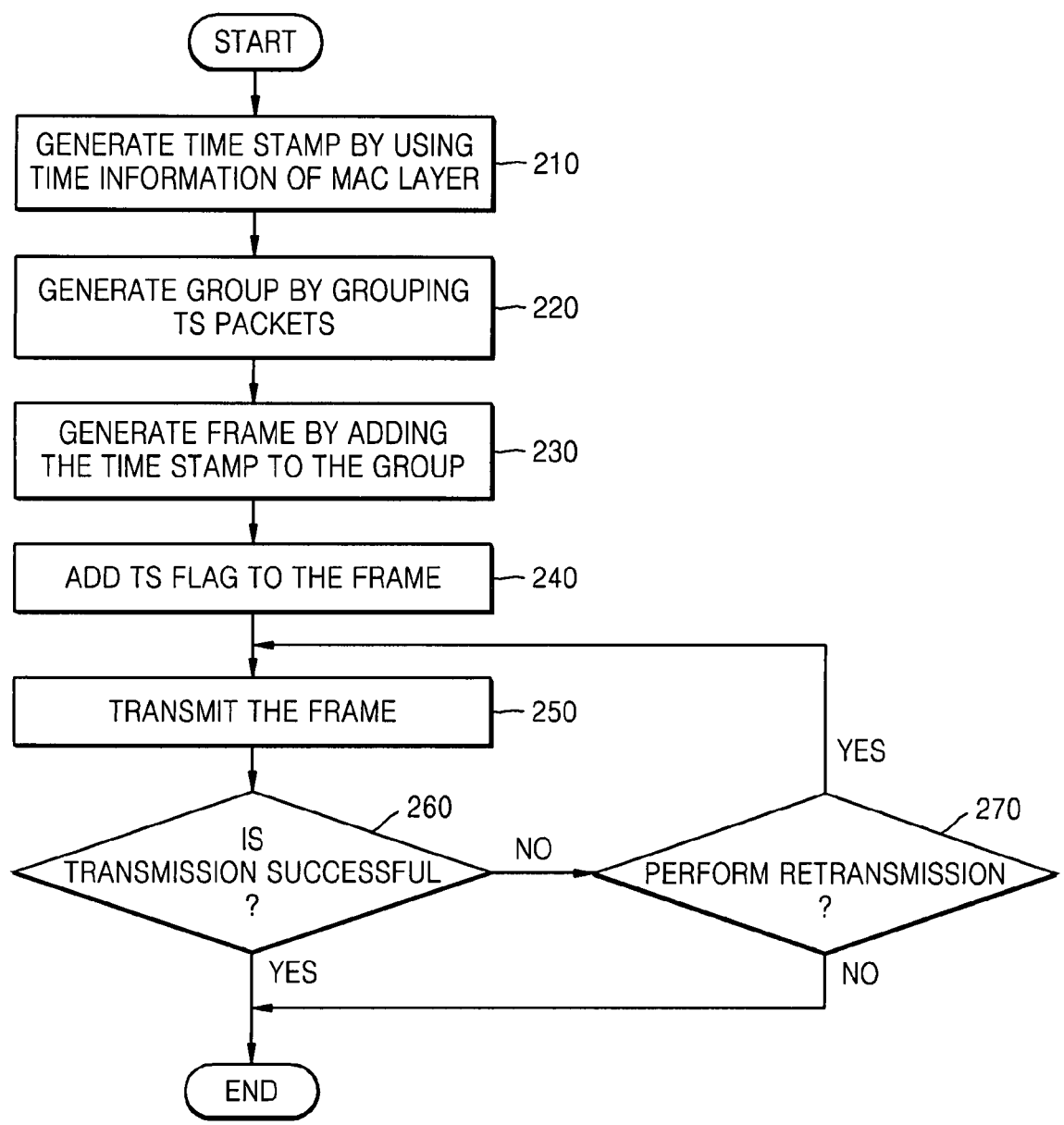
FIG. 2 is a flowchart showing operations for transmitting transport stream packets according to an exemplary embodiment of the present invention.

FIG. 2 is a flowchart showing operations for transmitting transport stream packets from a transmitting terminal according to an exemplary embodiment of the present invention;

In operation 210, a medium access control (MAC) layer of a transmitting terminal generates a time stamp for transport stream packets transmitted from an upper layer using time information that is managed by the MAC layer. The time information managed by the MAC layer is managed in synchronization with other terminals in a network in order to control medium use in the network by the MAC layer. Therefore, the environment applied to the present invention presupposes that MAC layers of the transmitting terminal and a receiving terminal support a time synchronization function.

For example, networks using the IEEE 802.11 or IEEE 802.15.3 standards or the like provide this function. In a wireless local area network (WLAN) using IEEE 802.11, the terminals perform the time synchronization in the MAC layers with reference to a timestamp field of a beacon frame. In a wireless personal area network (WPAN) using IEEE 802.15.3, the terminals perform the time synchronization in the MAC layers with reference to piconet synchronization parameters field of a beacon frame.

The MAC layer provides the time information to the upper layer by using a service access point (SAP).

In operation 220, the MAC layer forms a packet group by grouping the transport stream packets. The packet group is a group of a plurality of transport stream packets.

In operation 230, the MAC layer generates a MAC protocol data unit (MPDU) by adding a time stamp to the group. As described above, a plurality of transport stream packets are combined with a single time stamp in order to reduce network traffic. However, to do so, the MAC layers of the transmitting and receiving terminals have to know in advance a rule for outputting transport stream packets included in a corresponding group to an upper layer by using a single time stamp. An example of this rule is that when a time stamp is added to the front of a packet group, the time stamp represents the output time of a transport stream packet at the front of the packet group, and the next transport stream packets are output at predetermined intervals after the time represented by the time stamp.

In operation 240, a transport stream flag (TS flag) is represented in the generated MPDU. The TS flag is an identifier indicating that the transport stream packet is included in a payload of the MPDU. The MAC layer of the receiving terminal identifies the TS flag, extracts the time stamp from the MPDU, and outputs the transport stream packets to the upper layer with reference to the time information of the MAC layer.

The TS flag is represented by "type" information and/or "subtype" information recorded in a frame control field of an MPDU header. The TS flag may be represented by sequentially recording or spreading out identifiers which can be identified by using a hash function or various functions in a "frame body" of the MPDU. In addition, the TS flag may be represented by using a "reserved" field or a "service" field of a physical layer convergence procedure (PLCP) protocol data unit (PPDU).

In operation 250, a data frame including the MPDU is transmitted.

In operation 260, it is determined whether or not the transmission of the data frame has succeeded. This can be checked by using an acknowledgement (ACK) frame.

When the transmission fails, in operation 270, it is determined whether or not the transmission failed data frame will be retransmitted. In general, in a wireless network, when the transmission of the data frame fails, the terminal determines a retry limit in advance. However, according to the exemplary embodiment of the present invention, when the data frame includes the transport stream packet, the MAC layer of the transmitting terminal performs a different retransmission algorithm from that used for a general data frame. For example, the transmitting terminal may repeatedly retransmit the data frame until all the transport stream packets stored in a buffer of the receiving terminal are consumed. If the retransmission succeeds before all the transport stream packets in the buffer of the receiving terminal are consumed, the receiving terminal can generate image data without pops or clicks. In addition, a method of setting the retry limit for data frames including the transport stream packet differently from the retry limit for general frames, or a method of repeating the retransmission for a predetermined time can be used.

In the current exemplary embodiment, a plurality of transport stream packets is combined with a single time stamp. However, this operation is not necessarily needed in applications of the present invention, and a time stamp may be added to each transport stream packet. In this case, the aspect of the present invention in which the transmitting terminal generates the time stamp by using the time information of the MAC layer is not changed.

Figure 3:
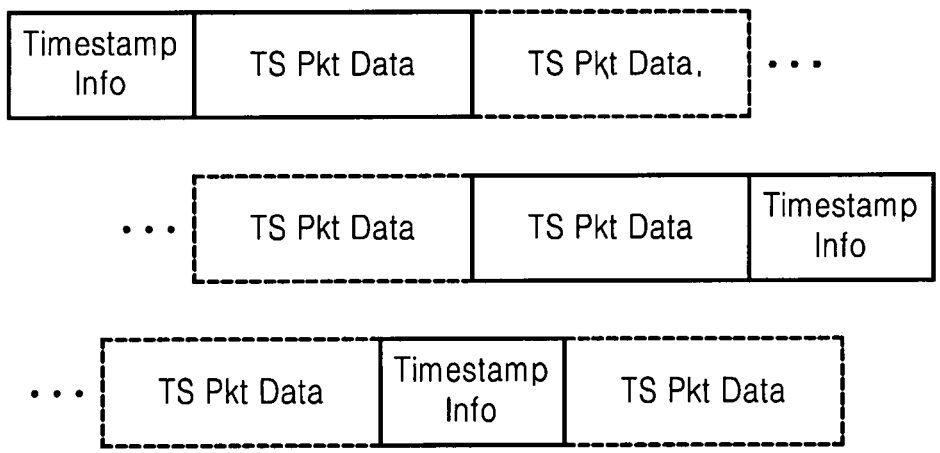
FIG. 3 shows groups of transport stream packets to which time stamps are added according to an exemplary embodiment of the present invention.

FIG. 3 shows groups of transport stream packets to which time stamps are added according to an exemplary embodiment of the present invention.

As shown in FIG. 3, the time stamp can be included at the front of the group of the transport stream packets, at the back thereof, or between the transport stream packets.

However, as described above, the MAC layers of the transmitting and receiving terminals have to know in advance the rule for outputting the transport stream packets included in a group to an upper layer by using a single time stamp. An example of such a rule is that, in a third case (where the time stamp is included between the transport stream packets), a transport stream packet on the left is output at the time represented by the time stamp, and a transport stream packet on the right is output 2 μs later than the time represented by the time stamp.

Figure 4:
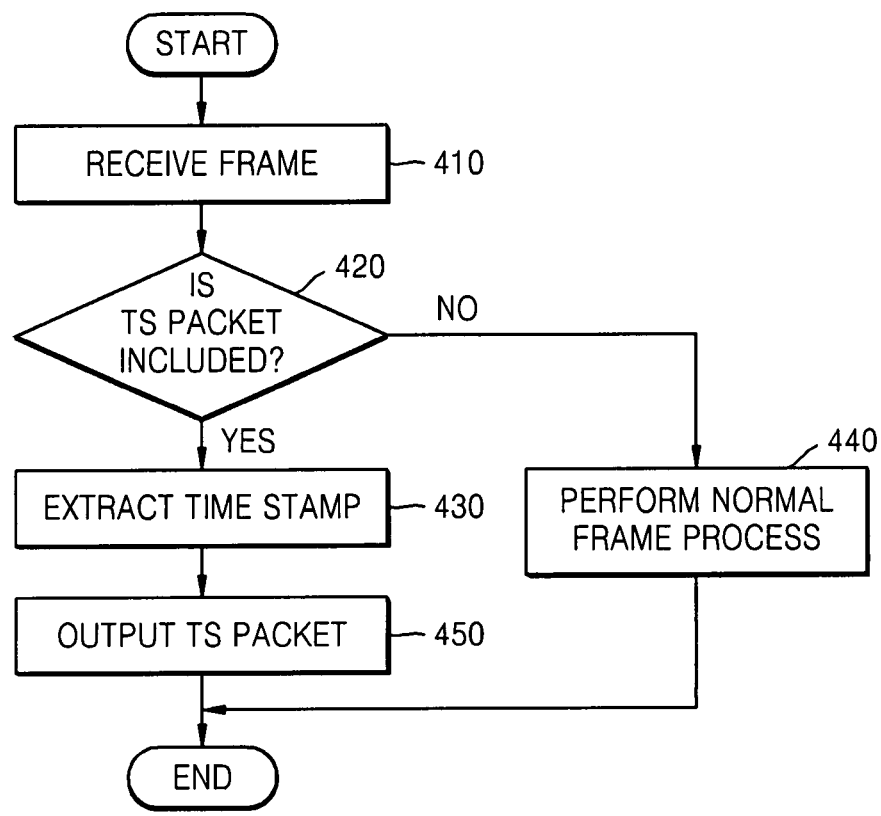
FIG. 4 is a flowchart showing operations for processing transmitted transport stream packets by a receiving apparatus according to an exemplary embodiment of the present invention.

FIG. 4 is a flowchart showing operations for processing transport stream packets by the receiving terminal according to an exemplary embodiment of the present invention.

In operation 410, the receiving terminal receives the data frame. In operation 420, it is determined whether or not a transport stream packet is included in the received data frame. The determination is performed by identifying the TS flag. Therefore, the receiving terminal determines whether or not the TS flag exists using a method such as referring to "type" information and/or "subtype" information recorded in the frame control field of the MPDU header or perceiving a pattern recorded in the "frame body" of the MPDU, or the like.

When the TS flag is not included in the data fame, in operation 440, the receiving terminal performs a general data frame processing process.

When the TS frame is included in the data frame, in operation 430, the MAC layer of the receiving terminal extracts the time stamp.

In operation 450, the MAC layer of the receiving terminal transmits the transport stream packets to the upper layer with reference to the extracted time stamp and the time information managed by the MAC layer.

Figure 5:
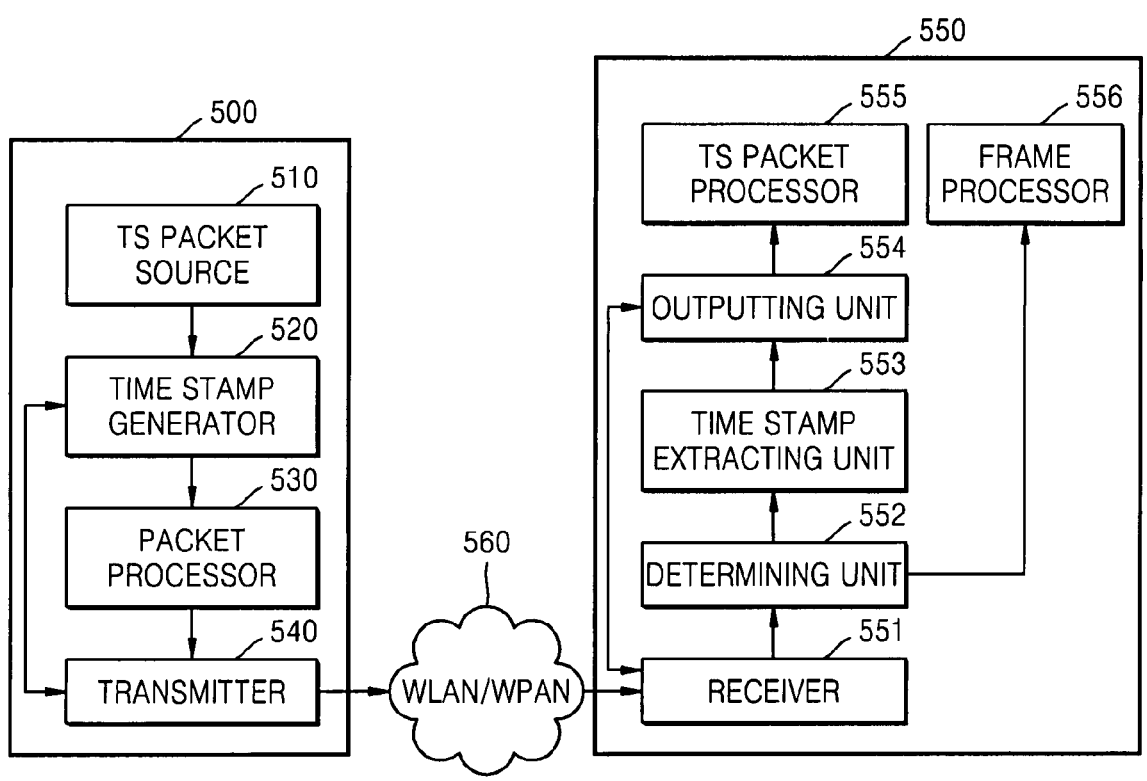
FIG. 5 is block diagram showing the structures of an apparatus for transmitting transport stream packets and an apparatus for receiving and processing the transport stream packets according to an exemplary embodiment of the present invention.

FIG. 5 is block diagram showing the structures of an apparatus for transmitting transport stream packets and an apparatus for receiving and processing the transport stream packets according to an exemplary embodiment of the present invention.

As shown in FIG. 5, the transmitting terminal 500 includes a TS packet source 510, a time stamp generator 520, a packet processor 530, and a transmitter 540. The receiving terminal 550 includes a receiver 551, a determining unit 552, a time stamp extracting unit 553, an outputting unit 554, a TS packet processor 555, and a frame processor 556.

In the transmitting terminal 500, the TS packet source 510 provides transport stream packets and generally may be a Moving Picture Experts Group (MPEG) encoder or a storage device.

The time stamp generator 520 generates time stamps based on the times when the transport stream packets from the TS packet source 510 arrive. Here, the time stamp generator 520 refers to the time information managed by the MAC layer. In addition, the transmitter 540 is a module operating in the MAC layer. Therefore, the transmitter 540 provides the time information to the time stamp generator 520.

The packet processor 530 generates an MPDU by adding the time stamps to the transport stream packets. More specifically, packet groups may be generated by grouping a plurality of transport stream packets, and the MPDU may be generated by adding the time stamps to the packet groups. In addition, the packet processor 530 records a TS flag in the MPDU. According to an implemented example, the TS flag may be represented using a "reserved" field or a "service" field of a PPDU. In this case, the packet processor 530 may use a SAP provided by a physical layer.

The transmitter 540 transmits a data frame including the MPDU output from the packet processor 530 to a network 560. Here, when a transmission error occurs, the transmitter 540 does not use a retry limit determined by the network 560, which is used for the general data frame, but performs transmission according to a predetermined algorithm.

More specifically, the transmitter 540 may repeatedly retransmit the data frame until all the transport stream packets which are transmitted to the receiving terminal in advance and stored in the buffer of the receiving terminal, are consumed.

Next, in the receiving terminal 550, the receiver 551 receives the data frame through the network 560. The determining unit 552 determines whether or not the data frame received by the receiver 551 includes the transport stream packet. The determination is performed by identifying the TS flag included in the data frame. According to the result of the determination by the determining unit 552, when the TS flag is not included in the data frame, the frame processor 556 performs the general data frame processing process.

When it is determined that the TS flag is included in the data frame, the time stamp extracting unit 553 extracts the time stamp from the MPDU.

The outputting unit 554 outputs the transport stream packets to the TS packet processor 555 based on the time stamps extracted by the time stamp extracting unit 553. The TS packet processor 555 consumes the transport stream packets and may be an MPEG decoder or a display device. Here, the outputting unit 554 outputs the transport stream packets with reference to the time information managed by the MAC layer, and the receiver 551 corresponds to the MAC layer. Therefore, the receiver 551 can provide the time information to the outputting unit 554.

Accordingly, the time information used to generate the time stamp for the transport stream packet is provided from the MAC layer of the terminal connected to the network. Therefore, there is no need to transmit or receive additional packets in order to precisely transmit the transport stream packets between the receiving and transmitting terminals.

In addition, adding a single time stamp to a plurality of transport stream packets reduces network traffic.

Also, the transport stream packets are controlled based on time in the MAC layer, so that time characteristics of the transport stream packets in network can be preserved. Therefore, performance deterioration caused from latency or jitter decreases.

The exemplary embodiments of the present invention can be written as computer programs and can be implemented in general-use digital computers that execute the programs using a computer readable recording medium. Examples of the computer readable recording medium include magnetic storage media (e.g. ROM, floppy disks, hard disks, etc.), optical recording media (e.g. CD-ROMs, or DVDs), and storage media such as carrier waves (e.g. transmission through the Internet).

While the present invention has been particularly shown and described with reference to exemplary embodiments thereof, it will be understood by those skilled in the art that various changes in form and detail may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting a transport stream packet from a terminal connected to a network, the method comprising:

generating, at a medium access control (MAC) layer of the terminal, a time stamp with reference to time information managed in synchronization with a second terminal in the network;

generating, at the MAC layer, a data frame, the data frame including an MAC protocol data unit (MPDU);

adding the transport stream packet to a payload of the MPDU;

adding the time stamp to the MPDU;

adding to the MPDU an identifier that indicates the transport stream packet is included in the payload of the MPDU; and transmitting the data frame to the second terminal, wherein the time information is managed in synchronization with the second terminal in the network in order to control medium use in the network by the MAC layer.

2. The method of claim 1, wherein the network is a wireless local area network (WLAN), and wherein the time information is a value which is set with reference to a time stamp field of a beacon frame.

3. The method of claim 1, wherein the network is a wireless personal area network (WPAN), and wherein the time information is a value which is set with reference to a piconet synchronization parameters field of a beacon frame.

4. The method of claim 1, wherein the transport stream packet comprises a plurality of transport stream packets, and wherein the method further comprises generating a packet group by grouping the plurality of transport stream packets, the adding the time stamp comprises adding the time stamp to the packet group.

5. The method of claim 4, wherein the generating the data frame further comprises recording, in the MPDU, the identifier indicating that the plurality of transport stream packets are included in the MPDU.

6. The method of claim 5, wherein in the MPDU, the identifier indicating that the plurality of transport stream packets are included in the MPDU is recorded by using type information or subtype information recorded in a frame control field of an MPDU header.

7. The method of claim 1, wherein in the transmitting, when a transmission error occurs, retransmission is performed based on a predetermined set value and not based on a retry limit set by the network.

8. The method of claim 1, wherein the transport stream packet comprises a plurality of transport stream packets, and wherein in the transmitting, when a transmission error occurs, retransmission is performed until all the plurality of transport stream packets which are transmitted in advance and stored in a buffer of the second terminal which receives the transport stream packets, are consumed.

9. A non-transitory computer-readable medium having embodied thereon a computer program for executing a method of transmitting a transport stream packet from a terminal connected to a network, the method comprising:

generating, at a medium access control (MAC) layer of the terminal, a time stamp with reference to time information managed in synchronization with a second terminal in the network;

generating, at the MAC layer, a data frame, the data frame including an MAC protocol data unit (MPDU);

adding the transport stream packet to a payload of the MPDU;

adding the time stamp to the MPDU;

adding to the MPDU an identifier that indicates the transport stream packet is included in the payload of the MPDU; and transmitting the data frame to the second terminal, wherein the time information is managed in synchronization with the second terminal in the network in order to control media use in the network by the MAC layer.

10. An apparatus for transmitting a transport stream packet from a terminal connected to a network, the apparatus comprising:

a time stamp generator which generates, at a medium access layer (MAC) of the terminal, a time stamp with reference to time information managed in synchronization a second terminal in the network;

a packet processor which generates, at the MAC layer, a data frame, the data frame including an MAC protocol data unit (MPDU), adds the transport stream packet to a payload of the MPDU, adds the time stamp to the MPDU, and adds to the MPDU an identifier that indicates the transport stream packet is included in the payload of the MPDU; and a transmitter which transmits the data frame to the second terminal, wherein the time information is managed in synchronization with the second terminal in the network in order to control medium use in the network by the MAC layer.

11. The apparatus of claim 10, wherein the network is a wireless local area network (WLAN), and wherein the time information is a value which is set based on a time stamp field of a beacon frame.

12. The apparatus of claim 10, wherein the network is a wireless personal area network (WPAN), and wherein the time information is a value which is set based on a piconet synchronization parameters field of a beacon frame.

13. The apparatus of claim 10, wherein the transport stream packet comprises a plurality of transport stream packets, and wherein the packet processor generates a packet group by grouping the plurality of transport stream packets, generates the MPDU by adding the time stamp to the generated packet group, and generates the data frame, the data frame including the MPDU, the MPDU including the packet group and the time stamp.

14. The apparatus of claim 13, wherein the packet processor records, in the MPDU, the identifier indicating that the plurality of transport stream packets are included in the MPDU.

15. The apparatus of claim 14, wherein the packet processor records the identifier indicating that the plurality of transport stream packets are included in the MPDU by using type information or subtype information recorded in a frame control field of an MPDU header.

16. The apparatus of claim 10, wherein when a transmission error occurs, the transmitter performs retransmission based on a predetermined set value and not based on a retry limit set by the network.

17. The apparatus of claim 10, wherein the transport stream packet comprises a plurality of transport stream packets, and wherein when a transmission error occurs, the transmitter performs retransmission until all the plurality of transport stream packets which are transmitted in advance and stored in a buffer of the second terminal which receives the transport stream packets, are consumed.

18. A method of processing a transport stream packet in a medium access control (MAC) layer of a terminal connected to a network, the method comprising:

receiving a data frame from a second terminal in the network, the data frame including a medium access control (MAC) protocol data unit (MPDU), the MPDU comprising the transport stream packet added to a payload of the MPDU, a time stamp added to the MPDU, and an identifier added to the MPDU that indicates the transport stream packet is included in the payload of the MPDU;

extracting, by the MAC layer, the time stamp from the received data frame based on the identifier; and outputting, at the MAC layer, the transport stream packet included in the data frame, with reference to the extracted time stamp and time information managed in synchronization with the second terminal, wherein the time information is managed in synchronization with the second terminal in the network in order to control medium use in the network by the MAC layer.

19. The method of claim 18, wherein the transport stream packet comprises a plurality of transport stream packets, and wherein the outputting comprises outputting the plurality of transport stream packets the time stamp according to a predetermined rule.

20. The method of claim 18, further comprising determining whether the transport stream packet is included in the payload of the MPDU based on the identifier, the identifier comprising type information or subtype information recorded in a frame control field of an MPDU header of the data frame, wherein the extracting and outputting operations are performed on the data frame including the transport stream packet according to a result of the determining.

21. A non-transitory computer-readable medium having embodied thereon a computer program for executing a method of processing a transport stream packet in a medium access control (MAC) layer of a terminal connected to a network, the method comprising:

receiving a data frame from a second terminal in the network, the data frame including a medium access control (MAC) protocol data unit (MPDU), the MPDU comprising the transport stream packet added to a payload of the MPDU, a time stamp added to the MPDU, and an identifier added to the MPDU that indicates the transport stream packet is included in the payload of the MPDU;

extracting, by the MAC layer, the time stamp from the received data frame based on the identifier; and outputting, at the MAC layer, the transport stream packet included in the data frame, with reference to the extracted time stamp and time information managed in synchronization with the terminal, wherein the time information is managed in synchronization with the second terminal in the network in order to control medium use in the network by the MAC layer.

22. An apparatus for processing a transport stream packet in a medium access control (MAC) layer of a terminal connected to a network, the apparatus comprising:

a receiver that receives a data frame from a second terminal in the network, the data frame including a medium access control (MAC) protocol data unit (MPDU), the MPDU comprising the transport stream packet added to a payload of the MPDU, a time stamp added to the MPDU, and an identifier added to the MPDU that indicates the transport stream packet is included in the payload of the MPDU, the time stamp generated at an MAC layer of the second terminal;

a time stamp extracting unit which extracts, at the MAC layer, the time stamp from the received data frame based on the identifier; and an outputting unit which outputs, at the MAC layer, the transport stream packet included in the data frame with reference to the extracted time stamp and time information managed in synchronization with the second terminal, wherein the time information is managed in synchronization with the second terminal in the network in order to control medium use in the network by the MAC layer.

23. The apparatus of claim 22, wherein the transport stream packet comprises a plurality of transport stream packets, and wherein the outputting unit outputs the plurality of transport stream packets by using the time stamp according to a predetermined rule.

24. The apparatus of claim 22, further comprising a determining unit that determines whether the transport stream packet is included in the payload of the MPDU based on the identifier, the identifier comprising type information or subtype information recorded in a frame control field of an MPDU header of the data frame.

* * * * *